United States Patent
Chuang et al.

(10) Patent No.: US 9,364,931 B2
(45) Date of Patent: Jun. 14, 2016

(54) LASER-ASSISTED MACHINING DEVICE

(71) Applicant: METAL INDUSTRIES RESEARCH AND DEVELOPMENT CENTRE, Kaohsiung (TW)

(72) Inventors: Yin Chuang, Kaohsiung (TW); Chao-Yung Yeh, Kaohsiung (TW); Chung-Li Tsai, Kaohsiung (TW); Yu-Ting Lyu, Sihu Township (TW)

(73) Assignee: Metal Industries Research and Development Centre, Kaohsiung (TW)

( * ) Notice: Subject to any disclaimer, the term of this patent is extended or adjusted under 35 U.S.C. 154(b) by 131 days.

(21) Appl. No.: 14/510,544

(22) Filed: Oct. 9, 2014

(65) Prior Publication Data

US 2016/0101492 A1   Apr. 14, 2016

(51) Int. Cl.
| | |
|---|---|
| B23P 25/00 | (2006.01) |
| B23K 26/00 | (2014.01) |
| B23C 3/00 | (2006.01) |

(52) U.S. Cl.
CPC ............. *B23P 25/006* (2013.01); *B23C 3/00* (2013.01); *B23C 2226/18* (2013.01); *B23C 2260/56* (2013.01)

(58) Field of Classification Search
CPC ....... B23P 25/006; B23P 25/003; B23C 9/00; B23C 2220/48; B23C 2228/26; B23K 26/0093; B23K 26/38; B23K 26/0604; B23K 26/0066; B23K 26/0081; Y10T 408/96
USPC ............. 219/121.67, 121.68, 121.74, 121.72, 219/121.77
See application file for complete search history.

(56) References Cited

U.S. PATENT DOCUMENTS

| | | | | |
|---|---|---|---|---|
| 4,667,080 A * | 5/1987 | Juptner | ................... | B23K 26/02 219/121.74 |
| 5,906,459 A * | 5/1999 | Thomas | .................... | B23C 3/00 219/121.6 |
| 6,666,630 B2 * | 12/2003 | Zimmermann | ........... | B23C 3/00 219/121.6 |
| 7,002,100 B2 * | 2/2006 | Wu | ..................... | B23K 26/0093 219/121.67 |
| 7,257,879 B1 * | 8/2007 | Jancso | ...................... | B23C 3/28 219/121.67 |
| 8,053,705 B2 * | 11/2011 | Shin | ...................... | B23P 25/006 219/121.72 |

FOREIGN PATENT DOCUMENTS

| | | | | |
|---|---|---|---|---|
| DE | 102009058254 A1 * | 9/2010 | ......... | B23K 26/0652 |
| DE | 102011102787 A1 * | 12/2011 | ......... | B23K 26/0676 |
| WO | WO 2004/016386 A1 * | 2/2004 | ........... | B23K 26/067 |

* cited by examiner

*Primary Examiner* — Sunil K Singh
*Assistant Examiner* — Ryan Rufo
(74) *Attorney, Agent, or Firm* — Lewis Roca Rothgerber Christie LLP

(57) ABSTRACT

A laser-assisted machining device includes a spindle, a beam splitting module and a cutting tool. The spindle has a chamber, and multiple exit holes. The beam splitting module is disposed in the spindle and includes a beam splitter for splitting a main laser beam into a plurality of secondary laser beams that are directed into the chamber, and an outer reflecting unit mounted in the chamber for reflecting the secondary laser beams out of the spindle through the exit holes. The cutting tool is fixedly mounted on the spindle, for machining a workpiece, and includes multiple cutting teeth. The secondary laser beams maintain constant irradiation on multiple areas of the workpiece during rotation of the spindle.

6 Claims, 3 Drawing Sheets

LASER-ASSISTED MACHINING DEVICE

BACKGROUND OF THE INVENTION

1. Field of the Invention

The invention relates to a machining device, more particularly to a laser-assisted machining device.

2. Description of the Related Art

Referring to FIG. 1, a conventional laser-assisted machining device as disclosed in Taiwan Patent No. 580416 (Application No. 091134563), is shown to include a cutting tool 12 mounted on a tool post and tool holders 11 for machining a ceramic workpiece 13, and a laser head 14 mounted on the tool post and tool holders 11 proximate to the cutting tool 12 for generating a laser beam to assist in machining the ceramic workpiece 13.

For the conventional laser-assisted machining device, the aim of the laser beam cannot be precisely adjusted to locate the edge of the cutting tool 12, causing heating in undesired locations. Referring to FIG. 2, a zone (A) of the ceramic workpiece 13 is heated due to irradiation by the laser beam. An adjacent zone (B) of the ceramic workpiece 13 is not irradiated and heated by the laser beam. During machining, the cutting tool 12 proceeds in a direction from the zone (B) to the zone (A). The unheated zone (B) is machined by the cutting tool 12 with the lower cutting force due to the adjacent zone (A) which is being heated and softened Consequently, the cutting tool 12 may easily remove both the zones (A, B) altogether. Moreover, if the cutting tool 12 of the conventional laser-assisted machining device has more than one cutting tooth (e.g., a milling cutter), the laser beam would not be able to irradiate the areas in front of the cutting edges.

SUMMARY OF THE INVENTION

Therefore, the object of the present invention is to provide a laser-assisted machining device that can eliminate the aforesaid drawbacks of the prior art. According to the present invention, there is provided a laser-assisted machining device adapted to be mounted on a machining tool, and including a laser generating unit, a spindle, a beam splitting module and a cutting tool. The laser generating unit is adapted to be mounted on the machining tool for generating a main laser beam. The spindle includes a hollow shaft body, a hollow shaft core and a plate body. The shaft body is adapted to be mounted rotatably on the machining tool and is spaced apart from the laser generating unit. The hollow shaft core is mounted co-rotatably in the shaft body, and has a channel extending along a longitudinal axis of the hollow shaft core, and an entry hole communicating with the channel and the external environment. The plate body is connected co-rotatably to and surrounds the hollow shaft core, and defines a chamber in spatial communication with the channel. The plate body has a light output surface disposed opposite to the entry hole along the longitudinal axis, and a plurality of exit holes formed in the light output surface.

The beam splitting module is disposed in the spindle and includes a beam splitter and an outer reflecting unit. The beam splitter is disposed in the channel for splitting the main laser beam into a plurality of secondary laser beams that are directed into the chamber. The outer reflecting unit is mounted in the chamber for reflecting the secondary laser beams out of the spindle through the exit holes.

The cutting tool is fixedly mounted on the spindle, is adapted for machining a workpiece, and includes a plurality of cutting teeth. The secondary laser beams travel respectively through the exit holes to irradiate respectively a plurality of processing areas on the workpiece, such that, during rotation of the spindle, the secondary laser beams maintain constant irradiation on the processing areas.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
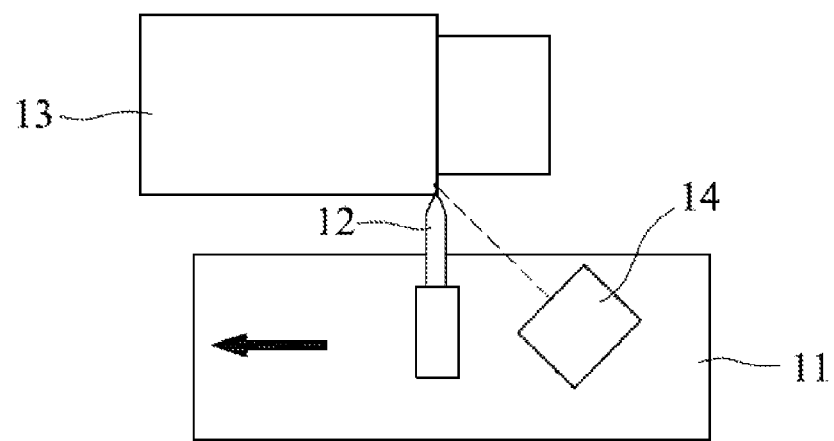
FIG. 1 is a schematic view of a conventional laser-assisted machining device.
Figure 2:
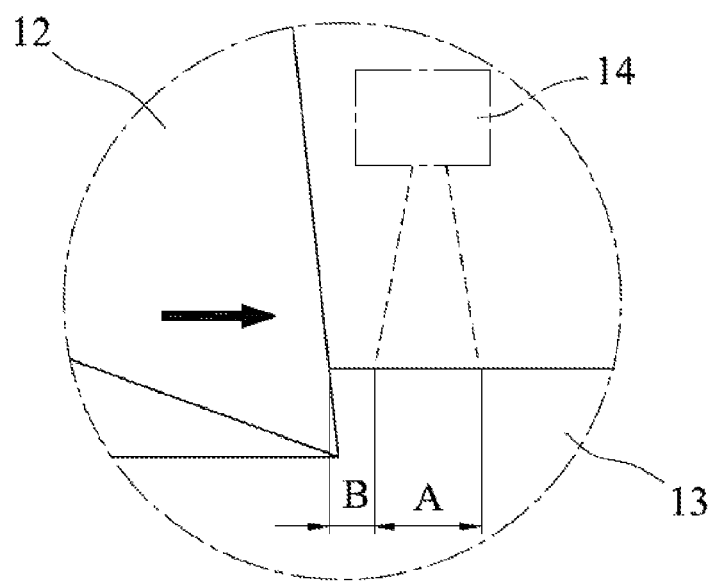
FIG. 2 is an enlarged view for illustrating removal machining process performed by the conventional laser-assisted machining device.
Figure 3:
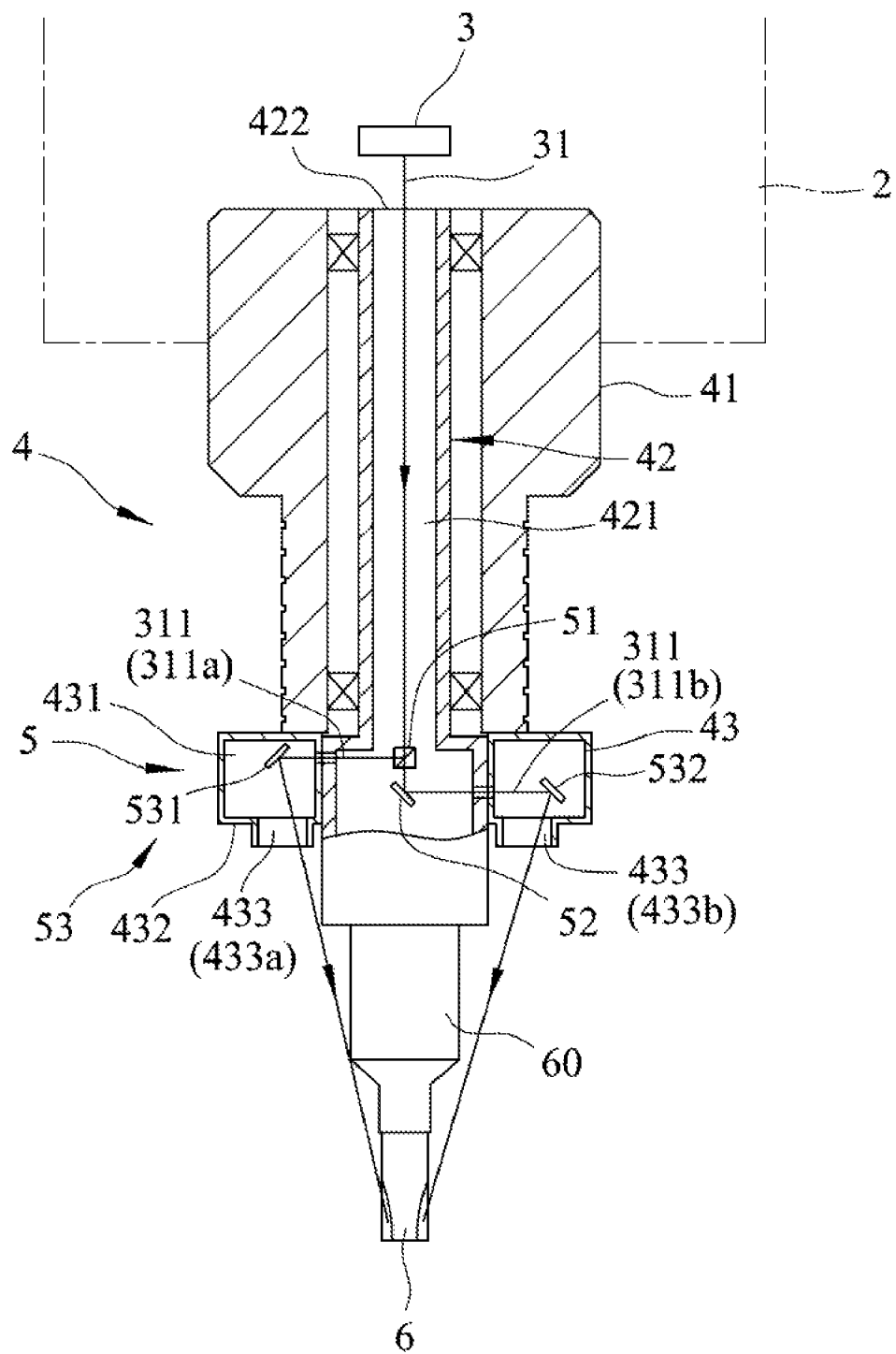
FIG. 3 is a sectional view of the preferred embodiment of a laser-assisted machining device according to the present invention.

Referring to FIG. 3, the preferred embodiment of a laser-assisted machining device according to the present invention is adapted to be mounted on a machining tool 2. The laser-assisted machining device includes a laser generating unit 3, a spindle 4, a beam splitting module 5 and a cutting tool 6. The laser generating unit 3 is adapted to be mounted on the machining tool 2 for generating a main laser beam 31 into the spindle 4.

The spindle 4 includes a hollow shaft body 41, a hollow shaft core 42 and a plate body 43. The shaft body 41 is adapted to be mounted rotatably on the machining tool 2, is spaced apart from the laser generating unit 3, and is driven to rotate by the machining tool 2. The hollow shaft core 42 is mounted co-rotatably in the shaft body 41, and has a channel 421 extending along a longitudinal axis of the hollow shaft core 42, and an entry hole 422 communicating with the channel 421 and the external environment. The plate body 43 is connected co-rotatably to and surrounds the hollow shaft core 42, and defines a chamber 431 in spatial communication with the channel 421. The plate body 43 has a light output surface 432 disposed opposite to the entry hole 422 along the longitudinal axis, and a plurality of exit holes 433 formed in the light output surface 432 and communicating with the chamber 431. In this embodiment, there are two exit holes 433.

The beam splitting module 5 is disposed in the spindle 4, and includes a beam splitter 51, an inner reflecting unit 52 and an outer reflecting unit 53. The beam splitter 51 is disposed in the channel 421 for splitting the main laser beam 31 into a plurality of secondary laser beams 311. The inner reflecting unit 52 is disposed in the channel 421 and spaced apart from the beam splitter 51 for reflecting a portion of the secondary laser beams 311 into the chamber 431. The outer reflecting unit 53 is mounted in the chamber 431 for reflecting the secondary laser beams 311 out of the spindle 4 through the corresponding exit holes 433.

Figure 4:
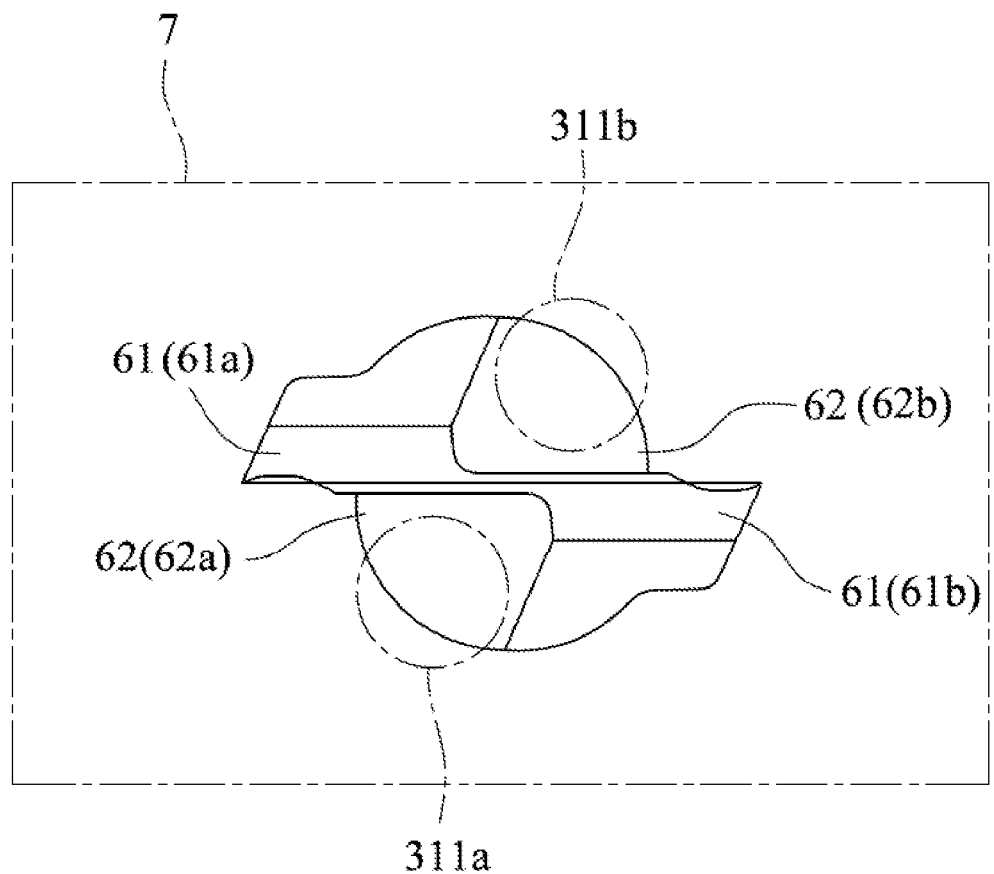
FIG. 4 is a schematic view for illustrating two secondary laser beams irradiating two respective processing areas on a workpiece.

With further reference to FIG. 4, the cutting tool 6 is fixedly mounted on the spindle 4 via a clamp 60, is adapted for machining a workpiece 7, and includes a plurality of cutting teeth 61. The secondary laser beams 311 respectively travel through the exit holes 433 to respectively irradiate a plurality of processing areas 62 on the workpiece 7, such that, during rotation of the spindle 4, the secondary laser beams 311 maintain constant irradiation on the processing areas 62. In this embodiment, the cutting tool 6 is a cutter with two cutting teeth 61, namely a first blade 61*a* and a second blade 61*b* disposed symmetrically to each other. The edge of each of the first blade 61*a* and the second blade 61*b* is proximate to the respective one of the processing areas 62; a first processing area 61 and a second processing area 62.

In this embodiment, the beam splitter 51 is a light splitting mirror which splits the main laser beam 31 into two secondary laser beams 311, namely a first secondary laser beam 311*a* and a second secondary laser beam 311*b*. The inner reflecting unit 52 is a total-reflection plane mirror. The outer reflecting unit 53 includes a first reflecting mirror 531 and a second reflecting mirror 532 spaced apart from each other.

The first secondary laser beam 311*a* directly enters the chamber 431, is reflected by the first reflecting mirror 531 and exits through the first exit hole 433*a* to target the first processing area 62*a*.

The second secondary laser beam 311*b* is reflected by the inner reflecting unit 52 to enter the chamber 431 and is subsequently reflected by the second reflecting mirror 532, and exits through the second exit hole 433*b* to target the second processing area 62*b*. In other words, the first and second secondary laser beams 311*a*, 311*b* travel respectively through the first and second exit holes 433*a*, 433*b* in order to land respectively in front of the edges of the first and second cutting teeth 61*a*, 61*b*.

During machining, the machining tool 2 drives the spindle 4 to co-rotate with the cutting tool 6, and the first secondary laser beam 311*a* and the second secondary laser beam 311*b* constantly irradiate the first processing area 62*a* and the second processing area 62*b*, respectively. By virtue of the design of the beam splitting module 5, the first and second reflecting mirrors 531, 532 are separately movable for adjusting paths of the first and second secondary laser beams 311*a*, 311*b* to focus on the same plane and to respectively overlap the first and second processing areas 62*a*, 62*b*.

As the first secondary laser beam 311*a* irradiates the first processing area 62*a*, and the second secondary laser beam 311*b* irradiates the second processing area 62*b*, the first and second processing areas 62*a*, 62*b* are softened from the heat, reducing resistance to removal by the cutting tool 6. Through rotation of the cutting tool 6, the first blade 61*a* and the second blade 61*b* can easily remove the unwanted portions of the workpiece 7.

It should be noted herein that, in this embodiment, the cutting tool 6 is a cutter having two cutting teeth 61*a*, 61*b*. Accordingly, the laser-assisted machining device is designed to have two exit holes 433*a*, 433*b* to correspond to two processing areas 62*a*, 62*b*. However, in other embodiments, the cutting tool 6 may have more than two cutting teeth. Correspondingly, the number of the exit holes 433, and configurations of the beam splitter 51, the inner reflecting unit 52 and the outer reflecting unit 53 of the beam splitting module 5 can be adjusted accordingly so as to split the main laser beam 31 into a desired number of secondary laser beams 311 to irradiate a desired number of processing areas 62 on the workpiece 7 for the desired machining process.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A laser-assisted machining device adapted to be mounted on a machining tool, comprising:
    a laser generating unit adapted to be mounted on the machining tool for generating a main laser beam;
    a spindle including
        a hollow shaft body that is adapted to be mounted rotatably on the machining tool and that is spaced apart from said laser generating unit,
        a hollow shaft core that is mounted co-rotatably in said shaft body, and that has a channel extending along a longitudinal axis of said hollow shaft core, and an entry hole communicating with said channel and the external environment, and
        a plate body that is connected co-rotatably to and that surrounds said hollow shaft core and that defines a chamber in spatial communication with said channel, said plate body having a light output surface that is disposed opposite to said entry hole along the longitudinal axis, and a plurality of exit holes that are formed in said light output surface and that communicate with said chamber;
    a beam splitting module disposed in said spindle and including
        a beam splitter that is disposed in said channel for splitting the main laser beam into a plurality of secondary laser beams that are directed into said chamber, and
        an outer reflecting unit that is mounted in said chamber for reflecting the secondary laser beams out of said spindle through said exit holes; and
    a cutting tool fixedly mounted on said spindle, adapted for machining an workpiece, and including a plurality of cutting teeth, the secondary laser beams traveling respectively through said exit holes to irradiate respectively a plurality of processing areas the workpiece, such that, during rotation of said spindle, the secondary laser beams maintain constant irradiation on the processing areas.

2. The laser-assisted machining device as claimed in claim 1, wherein said beam splitting module further includes an inner reflecting unit that is disposed in said channel and that is spaced apart from said beam splitter for reflecting a portion of the secondary laser beams into said chamber.

3. The laser-assisted machining device as claimed in claim 2, wherein:
    said outer reflecting unit includes a first reflecting mirror and a second reflecting mirror spaced apart from each other; and
    the secondary laser beams include a first secondary laser beam entering said chamber to be reflected by said first reflecting mirror, and a second secondary laser beam being reflected by said inner reflecting unit to enter said chamber to be subsequently reflected by said second reflecting mirror.

4. The laser-assisted machining device as claimed in claim 3, wherein said exit holes include a first exit hole and a second exit hole, the first secondary laser beam being reflected by said first reflecting mirror to exit said chamber via said first exit hole, the second secondary laser beam being reflected by said second reflecting mirror to exit said chamber via said second exit hole.

5. The laser-assisted machining device as claimed in claim 4, wherein said cutting tool includes a first blade and a second blade disposed symmetrically to each other, the first and second secondary laser beams traveling respectively through said first and second exit holes and traveling respectively in front of said first and second cutting teeth to irradiate respectively the processing areas on the workpiece.

6. The laser-assisted machining device as claimed in claim 5, wherein said first and second reflecting mirrors are separately movable for adjusting paths of the first and second secondary laser beams to overlap the first and second processing areas.

\* \* \* \* \*